United States Patent [19]
Gross

[11] 3,948,642
[45] Apr. 6, 1976

[54] METHOD OF MELTING AND ARRANGEMENT THEREFOR

[75] Inventor: Reinhold Gross, Heiligenhaus, Germany

[73] Assignee: Klockner-Werke AG, Duisburg, Germany

[22] Filed: May 14, 1974

[21] Appl. No.: 469,968

[30] Foreign Application Priority Data

May 26, 1973 Germany............................ 2327073

[52] U.S. Cl. ...................... 75/12; 75/44 S; 75/65 R; 266/33 S
[51] Int. Cl.² ...................... C21C 5/52; C21B 11/00
[58] Field of Search ............ 75/12, 44 S, 65; 266/33

[56] References Cited
UNITED STATES PATENTS

| | | | |
|---|---|---|---|
| 2,624,565 | 1/1953 | Kompart | 75/44 S |
| 2,804,295 | 8/1957 | Brooke | 75/44 S |
| 3,353,807 | 1/1967 | Sixel | 75/12 |
| 3,447,420 | 6/1969 | Bartu | 75/44 S |
| 3,615,353 | 10/1971 | Mahoney | 75/44 S |
| 3,669,434 | 6/1972 | Geck | 75/44 S |
| 3,788,837 | 1/1974 | Geck | 75/44 S |

*Primary Examiner*—Peter D. Rosenberg
*Attorney, Agent, or Firm*—Michael J. Striker

[57] ABSTRACT

Particulate material such as scrap, sponge iron, prereduced pellets and the like is introduced into the top of a vertically arranged melting chamber and forms a column in the latter. The material is melted by directing a flame or an electric arc against the lower end of the column and the melt thus formed collects at the bottom of the chamber. As melting continues, fresh particulate material travels downwardly through the melting chamber to become exposed to the action of the flame or arc. A projection is provided at the bottom of the melting chamber and has an upper surface which is located above the level of the melt. The flame or arc is so adjusted that a portion of the lower end of the column bears against the upper surface of the projection. In this manner, the column is supported in the chamber without contacting the melt so that excessive loss of heat from the melt is prevented. If the flame or arc is annular, then the center of the lower end of the column will bear against the projection which latter will, in this case, be located in the center of the chamber. If the flame or arc is plate-shaped and is directed against the center of the lower end of the column, then the edge of the lower end of the column will bear against the projection which latter will, in this case, be located at the periphery of the chamber.

43 Claims, 2 Drawing Figures

METHOD OF MELTING AND ARRANGEMENT THEREFOR

BACKGROUND OF THE INVENTION

The invention relates generally to the melting of substances and, more particularly, to a method and arrangement for melting particulate materials.

The melting of scrap is known from the U.S. Pat. No. 3,775,544. Here, a column of scrap is formed in a vertically arranged melting chamber. A burner lance is located on the axis of the melting chamber and may extend into the latter either through the column of scrap or through the bottom of the chamber. The burner lance generates a plate-shaped flame which is directed against the lower end of the scrap column from below the latter. The flame is centered with respect to the scrap column and extends over the greater part of the cross-section of the same. In this manner, the scrap is continuously melted by the high temperature burner in a counter-current manner, meaning that fresh scrap moves downwardly through the melting chamber as the lower end of the scrap column melts to thereby become exposed to the action of the flame. The flame is positioned at such a distance above the bottom of the melting chamber that the molten material which continuously flows off is able to form a thermal barrier for the heatresistance lining of the melting chamber.

The molten material has a temperature which is only slightly higher than the liquidus temperature. This poses a discontinuous partially disadvantage when the molten material must be transported from the melting chamber to a converter, a Siemens-Martin oven or the like for further processing. Moreover, this may lead to blockage of the outlet opening of the melting chamber by molten material which has solidified. The latter is particularly the case when the molten material is to be further processed in a continuous operation so that the melting operation must be broken off. Thus, the molten material will solidify by virtue of the fact that the scrap column is particularly immersed therein so that heat is removed from the molten material.

Further known from the U.S. Pat. No. 2,382,534 is a melting chamber for melting scrap packets or briquettes. Here, the scrap packets are held in a charging shaft which is narrowed at a lower end thereof to fall from there into a bath of molten material where they are melted. This implies that within the molten material a temperature is maintained, not substantially exceeding the liquidus temperature so that difficulties arise when the molten material is tapped off, as the molten material has the tendency to freeze at the tapping holes because of the little difference between liquidus temperature and solidification temperature.

From the German Democratic Republic Pat. No. 21,760, there is also known an oven for the melting of iron and, in particular, pig iron. The oven is provided with a charging shaft of small dimensions and the charge descends through the roof of the oven to leave the charging shaft in conical manner and sink into the melt. Here, also, there is a large heat transfer between the molten material and the charge.

SUMMARY OF THE INVENTION

It is, therefore, a general object of the invention to provide a novel melting and arrangement.

Another object of the invention is to provide a novel method and arrangement for the melting of particulate substances.

A further object of the invention is to provide a method and arrangement for the melting of particulate substances which permit heat transfer between the charge and the melt to be held to a minimum.

An additional object of the invention is to provide a method and arrangement for melting particulate substances which enable the melt to be continuously withdrawn from the melting chamber.

It is also an object of the invention to provide a method and arrangement for melting particulate substances which enable the melt to be brought to a temperature suitable for pouring or casting.

Yet another object of the invention is to provide a method and arrangement for melting scrap, sponge iron, pellets and the like which enable freezing of the melt at the bottom of the melting chamber and in the outlets of the latter to be prevented.

A concomitant object of the invention is to provide a method and arrangement for melting scrap, sponge iron, pellets and the like which enable freezing of the melt at the bottom of the melting chamber and in the outlets of the latter to be prevented and which, in particular, enable the melt to be brought to a temperature suitable for pouring or casting.

These objects and others which will become apparent hereinafter are achieved in accordance with the invention. One feature of the invention, stated briefly, resides in a method for melting particulate substances, particularly for melting scrap, sponge iron, pre-reduced pellets and the like in melting chambers of high throughput capacity, which comprises forming a column of particulate material in a melting zone or chamber. Melting of the column is effected in a first region of the chamber so as to cause the formation of molten material which flows into a second region of the chamber. The melting is performed in such a manner as to permit at least one portion of the column to bear against a third region of the chamber which is substantially free of contact with the molten material so that the column is supported in the chamber during melting thereof while substantial heat transfer from the molten material to the column is prevented.

It may be seen that an important, although not exclusive, concern of the invention is with a method of melting a charge which is in the form of scrap, sponge iron, pre-reduced pellets or the like. The melting may be carried out in a vertically arranged melting chamber having a large throughput capacity. The melting chamber may have a substantially cylindrical cross-section and may flare slightly outwardly in downward direction thereof. A column of the charge is formed in the chamber and the column may be melted from below using a flame or an electric arc. The flame or arc may extend over the major part of the cross-section of the column of charge and it is of advantage when the flame or arc is positioned at such a distance above the bottom of the melting chamber that the molten material which continuously flows off forms a heat barrier or thermal insulation for the heat-resistant or fire-resistant lining which may be provided in the melting chamber. In accordance with the invention, the column of charge accommodated in the chamber is supported therein exteriorly of the molten material.

In this manner, the heat transfer between the molten material and the column of charge is very greatly reduced. The flame or electric arc directed against the lower end or portion of the column melts out part of this lower end so that the latter takes on an arch-shaped configuration and heat transfer between the molten material and the column occurs only via the molten material which flows downwardly along the surfaces or walls of the arch thus formed.

The invention further provides an arrangement for melting particulate substances, particularly for melting scrap, sponge iron, pre-reduced pellets and the like at high throughput, which comprises means defining a melting chamber adapted to accommodate a column of particulate material. Means is provided for melting the column in a first region of the chamber so as to cause the formation of molten material which flows into a second region of the chamber. The melting means is arranged in such a manner as to permit at least one portion of the column to bear against a third regionn of the chamber which is substantially free of contact with the molten material so that the column is supported in the chamber during melting thereof while substantial heat transfer from the molten material to the column is prevented.

The arrangement in accordance with the invention is particularly well-suited for carrying out the method of the invention. As already mentioned, the melting chamber may be vertically arranged and, according to the invention, it is advantageous when a pedestal or projection of heat-resistant or fire-resistant material is provided at the bottom of the melting chamber for supporting the column of charge. The supporting surface of the projection is then located above the level of the molten material which flows into the bottom region of the melting chamber.

The melting means may include flame-generating means. The flame may, for instance, be of ring-shaped or annular configuration. Such a flame may be generated by means of a plurality of oil-oxygen or oil-oxygen-air burners which are distributed about the circumference of the melting chamber in the region of the bottom of the latter. Advantageously, such a flame may also be generated by a corresponding ring-shaped or annular burner. Where an annular flame is used, the projection may be centrally arranged at the bottom of the melting chamber. If, in addition to the annular flame, there is used a plate-shaped flame produced by a burner lance which is centrally located in the melting chamber, then the projection should, correspondingly, be of ring-shaped or annular configuration and, in this case, should be provided with one or more passages for the molten material. On the other hand, if only a plate-shaped, centrally located flame is used, the projection may be provided at the periphery of the melting chamber. The melting means may also comprise an electric arc and, in such an event, the same considerations as outlined above for a flame or flames apply to correspondingly configurated electric arcs.

As the flame or electric arc melts the lower portion of the column, fresh particulate material descends through the melting chamber to become exposed to the action of the flame or electric arc. In general, it is favorable when the supporting surface of the projection corresponds to that surface with which the column of charge would bear against the bottom of the melting chamber in the absence of the projection. This makes it possible to achieve a uniform descent of the particulate material or the column of charge in the melting chamber.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
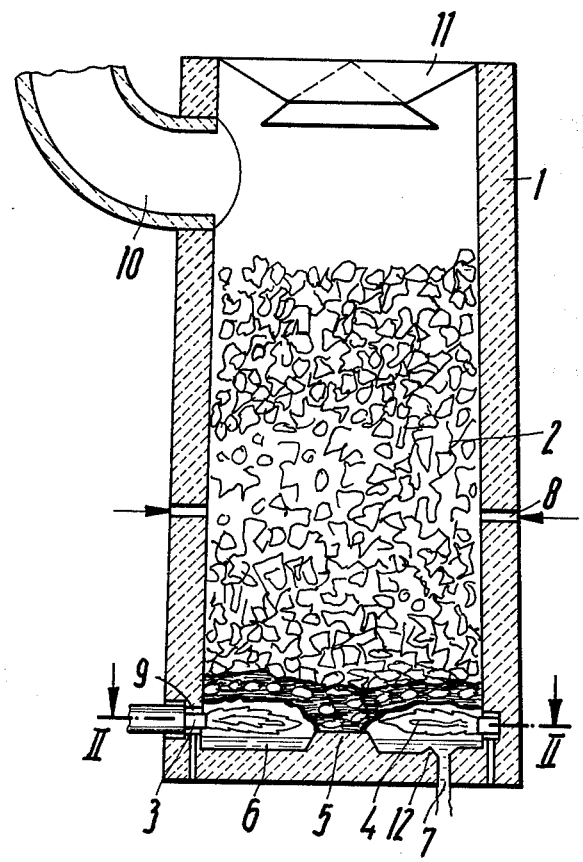
FIG. 1 schematically illustrates a section through one form of an arrangement in accordance with the invention which may be used for carrying out the method of the invention.
Figure 2:
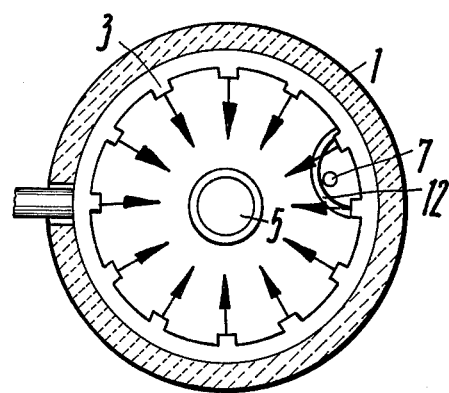
FIG. 2 is a view in the direction of the arrows II—II of FIG. 1.

Referring now to FIGS. 1 and 2, a melting chamber is indicated by reference numeral 1. It may be seen that the chamber 1 is of substantially cylindrical configuration and, if desired, the inner diameter of the chamber 1 may increase slightly in downward direction thereof as shown. At the top of the chamber 1 there is provided a charging opening in the region of which there may be arranged a charging device 11 for charging the chamber 1. Particulate material is admitted into the chamber 1 via the charging opening thereof and this may, for instance, be accomplished with the aid of a non-illustrated charging band or conveyor. The particulate material or charge may include scrap such as, for example, iron scrap, pellets, for instance, pre-reduced pellets, sponge iron or the like. Of course, the charge may comprise mixtures of these materials such as, for example, a mixture of scrap and pellets. Charging of the chamber 1 may proceed continuously. The charge forms a column 2 interiorly of the chamber 1.

As best seen in FIG. 2, a plurality of burners 3 is arranged about the circumference of the chamber 1. The burners 3 are effective for generating a ring-shaped or annular cutting torch-like flame 4. It will be understood throughout this description that, wherever reference is made to a flame, this is intended to encompass an electric arc. Thus, instead of the illustrated burners 3, the arrangement may be provided with electrodes for generating an electric arc.

The flame 4 impinges the column 2 from below, that is, the flame 4 impinges the lower or leading end of the column 2, and the action of the flame 4 causes the formation of a rotational-symmetric, disc-shaped cavity at the leading end of the column 2. It may be seen that this cavity has somewhat of an arch-shaped configuration. The flame 4 also causes the formation of that portion of the column 2 depicted in heavy black. The blackened portion of the column 2 represents that portion thereof where the outer surfaces of the particles have become soft. As a result of this softening, the individual particles of the charge weld to one another at their contact points. In this manner, there is formed the arch on which the remainder of the column 2 is supported.

Due to the annular configuration of the flame 4, the leading end of the column 2 is melted in such a manner that the outer circumferential portion thereof melts away preferentially to leave a downwardly projecting central portion. At the bottom of the chamber 1 there is provided a pedestal or projection 5 which extends upwardly from the bottom of the chamber 1 and is centrally located with respect to the cross-section of the chamber 1. The projection 5 is favorably formed of a heat-resistant or fire-resistant material. The central portion of the leading end of the column 2 bears against the upper surface of the projection 5 so that the column 2 is supported in the chamber 1. In the illustrated embodiment, the projection 5 is of circular cross-section. However, the configuration and position of the projection 5 will depend upon the configuration of the flame or electric arc used for the melting operation. For instance, if, in addition to the annular flame 4, there is used a centrally positioned flame of, for example, plate-shaped configuration, so that an annular space is defined between the latter flame and the flame 4, then the leading end of the column 2 would be melted in such a manner that a downwardly projecting portion of annular configuration would be formed therein. In such an event, the projection provided in the chamber 1 would also be of annular configuration so as to correspond to the annular configuration of the leading end of the column 2. On the other hand, if only a centrally positioned flame of, for example, plate-shaped configuration, were used, the leading end of the column 2 would be melted in such a manner that a cavity would be formed in the center thereof. In this case, the peripheral portion of the leading end of the column 2 would be downwardly projecting and, correspondingly, the projection in the chamber 1 would extend along the periphery of the latter. In general, it may be seen that the configuration of the projection provided in the chamber 1 will advantageously correspond to the configuration of that portion of the leading end of the column 2 which is less readily melted away due to the configuration of the flame or electric arc used.

Melting of the column 2 may proceed continuously. As the leading end of the column 2 melts, fresh particulate material moves downwardly in the chamber 1 to become exposed to the action of the flame 4. Thus, if the melting operation is continuous, there will be a continuous descent of particulate material in the chamber 1. The molten material produced by the melting operation flows downwardly in the chamber 1 to the bottom thereof to form a bath or melt 6. It may be seen that the level or surface of the bath 6 of molten material lies below the upper surface of the projection 5. As a result, the column 2 is supported in the chamber 1 while, at the same time, substantial contact between the column 2 and the molten material is prevented. Consequently, heat transfer between the column 2 and the molten material is minimized.

An outlet 7 is provided at the bottom of the chamber 1 for removal of the molten material from the latter. The molten material may continuously flow out of the chamber 1 via the outlet 7. Upon leaving the chamber 1, the molten material may flow into a suitable, non-illustrated receiving container or the like. Since the chamber 1 may be provided with a heat-resistant or fire-resistant lining, it is of advantage when the molten material serves as a thermal barrier or heat insulator for such a lining. This may be accomplished by providing for the flame 4 to be positioned at a sufficiently great distance above the bottom of the chamber 1.

The flame 4 advantageously extends over the major part of the cross-section of the column 2 as shown. Although the temperature at which melting takes place does not form part of the invention per se, it will be appreciated that the temperature of the flame 4, or of the electric arc where such is used, must be sufficiently high to enable melting of the particular material of the column 2 to be effected. The molten material produced during the melting operation may travel to the bottom of the chamber 1 by flowing along the surface or wall of the arch formed in the leading end of the column 2. The molten material arriving at the bottom of the chamber 1 may be superheated by the radiation of the melting flame only and/or by additional heating means, for example one or more additional burners not illustrated in the drawings.

According to another embodiment not shown, a certain amount of the molten material is collected in lower parts of the bottom before reaching a somewhat elevated outlet opening, so that a batch of molten material remains for a longer period under the effect of the superheating means, if so desired. In case the distance between the scrap column and the bath of molten material is sufficient for collecting a greater mass of molten material, instead of continuously withdrawing the molten material out of the vessel tapping may be provided for, depending on the collecting period for the molten material beneath the scrap column, as any contact between the molten bath and the scrap column must be avoided according to the invention. As the flame temperature of the usual oxygen-oil-burners as they are described for example in the German Pat. No. 1,800,610 reaches temperatures around 2000° to 2600° C, the influence of radiation heat for superheating the molten material is important as long as contact between the molten material and the scrap column is avoided according to the invention. It goes without saying that superheating need not add substantial heat to the molten material as a temperature exceeding the liquidus temperature by 50° C is sufficient to maintain the molten material in a pourable state without danger of freezing during the pouring operation unless too great a time elapses between superheating and pouring.

Referring once more to FIG. 1, it may be seen that the chamber 1 is shown as being provided with an annular slot or opening 8. The slot 8 may serve for the introduction of air into the interior of the chamber 1 so as to permit afterburning of the gases generated by the melting operation to be effected. In this manner, the gases generated during melting may be used to preheat the particulate material to be melted. The chamber 1 may be further provided with annular slits or openings 9 which surround the burners 3. Through the slits 9, it is possible to introduce reducing gas such as methane or the like into the interior of the chamber 1. Waste gases are withdrawn from the chamber 1 in the region of the upper end thereof via an exhaust conduit 10 provided for this purpose.

In connection with the preheating of the particulate material to be melted, it should be mentioned that such preheating may occur due to several effects. On the one hand, the particulate material located above the arch-shaped portion of the column 2 may be heated by heat conduction. On the other hand, the particulate material located above the arch-shaped portion of the column 2 may extract heat from the gases generated during melting. These gases may, as just mentioned, be subjected to after-burning in the upper portion of the chamber 1. The temperature in the upper portion of the column 2 does not form part of the invention per se and has no substantial significance for the invention, an important concern of the invention being the support of the column 2 in the chamber 1 with the minimum possible heat transfer between the column 2 and the molten metal or material. Moreover, it is difficult, if not impossible, to assign temperatures to the upper portion of the column 2 since these temperatures may also be dependent upon the length of the column 2.

Under some circumstances, it might be desirable to provide for a certain degree of superheating of the molten material. This may be accomplished by providing a projection 12 at the bottom of the chamber 1 about the outlet 7. The projection 12 has the effect that the molten material is not able to flow out of the chamber 1 immediately upon reaching the bottom thereof but remains on the bottom of the chamber 1 for a certain period of time which might only be a short time span. In this manner, the molten material will be subjected to the action of the flame 4 for an additional period of time to thereby become superheated by the flame 4.

In order to depress the liquidus temperature of the molten material, the latter may already be carburized at the bottom of the chamber 1, for instance, by blowing in coal or the like. This permits a greater superheating of the molten material to be achieved. It is also possible to use additional means for superheating the molten material land for accelerating the superheating process. Such means may be in the form of an induction coil or the like provided in the bottom of the chamber 1 or in the form of one or more flames or electric arcs which are separately directed onto the molten material. Flames or electric arcs of this type may be produced in various ways. On the one hand, it is possible to provide burners or electrodes which, respectively, generate a flame or an electric arc having a downwardly directed flame portion or arc portion. These burners or electrodes may be simultaneously used for the melting operation. On the other hand, it is also possible to provide burners or electrodes which are in addition to those used for melting and which generate flames or electric arcs directed onto the molten material.

The configuration of the flame or electric arc used for the melting operation may depend upon the type of melting chamber which is being utilized. For melting chambers of large diameter, it is advantageous when an annular flame or annular electric arc is used instead of a plate-shaped, centrally located flame or corresponding elctric arc. The reason is that a centrally located flame cannot normally spread out to any arbitrary or desired extent. On the other hand, by using an annular flame, it is possible to extend over a large melting region. In this connection, it should be mentioned that it is desirable to maintain the area over which the column of particulate material is supported as small as possible since otherwise difficulties may arise as regards the descent of the particulate material in the melting chamber. Moreover, ring-shaped or annular burners are favorable in that they are readily interchangeable and, in addition, by using annular burners, it becomes possible to observe the flame if necessary or desired.

It will be understood that each of the elements described above, or two or more together, may also find a useful application in other types of melting methods and arrangements differing from the types described above.

While the invention has been illustrated and described as embodied in a method of melting and arrangement therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed as new and desired to be protected by Letters Patent is set forth in the appended claims:

1. A method of melting particulate substances, comprising forming a column of particulate material in a melting zone; and effecting melting of said column in a first region of said zone so as to cause the formation of molten material which flows into a second region of said zone, said melting being performed such that at least one portion of said column is caused to support said column in said zone and bears against a third region of said zone which is substantially free of contact with the molten material in said second region of said zone thereby preventing substantial heat transfer from the molten material in said second region of said zone to said column during said melting.

2. A method as defined in claim 1, wherein said particulate material comprises at least one member of the group consisting of scrap, sponge iron and prereduced pellets.

3. A method of melting particulate substances, comprising forming a column of particulate material in a substantially vertically oriented melting zone, said column having a leading end located in a first region of said zone; and melting at least part of said leading end so as to cause the formation of molten material which flows into a second region of said zone, said melting being performed such that at least one portion of said column constituting a minor part of the cross-section of said column and constituting a part of said leading end is caused to support said column in said zone and bears against a third region of said zone which is substantially free of contact with the molten material in said second region of said zone thereby preventing substantial heat transfer from the molten material in said second region of said zone to said column during said melting, said particulate material descending along said zone as said melting progresses.

4. An arrangement for melting particulate substances, comprising means defining a substantially vertically oriented melting chamber for accommodating a column of particulate material to be melted, said chamber including a first region in which melting of said column occurs, a second region into which the molten material formed by melting of said column flows, and a third region arranged so that contact thereof by the molten material which has flowed into said second region is substantially prevented; and means for effecting melting of said column in said first region of said chamber, said melting means being arranged to melt said column in such a manner that at least one portion of said column is caused to support said column in said chamber and bears against said third region of said chamber thereby preventing substantial heat transfer from the molten material in said second region of said chamber to said column during melting.

5. A method as defined in claim 1, wherein said one portion of said column constitutes a minor part of the cross-section of said column.

6. A method as defined in claim 1, said zone being vertically oriented, and said particulate material descending along said zone; and wherein said melting comprises melting at least part of the leading end of said column.

7. A method as defined in claim 6, wherein said one portion of said column constitutes part of said leading end.

8. A method as defined in claim 7, said one portion of said column being of substantially annular configuration; and wherein said third region of said zone is of substantially annular configuration.

9. A method as defined in claim 7, said one portion of said column comprising a center portion of said leading end; and wherein said third region of said zone comprises a center region thereof.

10. A method as defined in claim 6, said second region of said zone comprising a bottom region thereof, and said molten material filling said bottom region to at most a predetermined level; and wherein said third region of said zone is located above said predetermined level.

11. A method as defined in claim 6, said second region of said zone comprising a heat-resistant bottom region thereof; and wherein said first region of said zone is located at a sufficient distance above said bottom region of said zone as to permit said molten material to cover and thermally insulate said bottom region of said zone.

12. A method as defined in claim 6, wherein said zone is of substantially circular cross-section.

13. A method as defined in claim 6, wherein at least a bottom section of said zone is of downwardly and outwardly flaring configuration.

14. A method as defined in claim 1, wherein said melting is performed continuously.

15. A method as defined in claim 1, wherein said melting comprises directing a flame at said column.

16. A method as defined in claim 15, wherein said flame extends across a major part of the cross-section of said column.

17. A method as defined in claim 1, wherein said melting comprises directing an electric arc at said column.

18. A method as defined in claim 17, wherein said electric arc extends across a major part of the cross-section of said column.

19. An arrangement as defined in claim 4, said second region of said chamber comprising a bottom region thereof; further comprising a projection extending upwardly of said bottom region of said chamber and having an upwardly facing surface portion; and wherein said third region of said chamber comprises said surface portion.

20. An arrangement as defined in claim 17, wherein said projection comprises heat-resistant material.

21. An arrangement as defined in claim 17, wherein said projection is substantially centered with respect to the cross-section of said chamber.

22. An arrangement as defind in claim 17, wherein said projection is of substantially circular configuration.

23. An arrangement as defined in claim 17, wherein said projection is of substantially annular configuration.

24. An arrangement as defined in claim 17, wherein said projection extends along a periphery of said chamber.

25. An arrangement as defined in claim 1, wherein said melting means is so arranged that said one portion of said column constitutes a minor part of the cross-section of said column.

26. an arrangement as defined in claim 25, wherein said melting means is arranged to melt at least part of the leading end of said column.

27. An arrangement as defined in claim 26, wherein said melting means is so rranged that said one portion of said column constitutes part of said leading end.

28. An arrangement as defined inn claim 27, said melting means being so arranged that said one portion of said column is of substantially annular configuration; and wherein said third region of said chamber is of substantially annular configuration.

29. An arrangement as defined in claim 27, said melting means being so arranged that said one portion of said column comprises a center region of said leading end; and wherein said third region of said chamber comprises a center region thereof.

30. An arrangement as defined in claim 27, said melting means being so arranged that said one portion of said column comprises a peripheral portion of said leading end; and wherein said third region of said chamber comprises a peripheral region thereof.

31. An arrangement as defined in claim 26, said second region of said chamber comprising a bottom region thereof which is adapted to be filled with said molten material to at most a predetermined level; and wherein said third region of said chamber is located above said predetermined level.

32. An arrangement as defined in claim 26, said second region of said chamber comprising a bottom region thereof; further comprising a heat-resistant lining at said bottom region; and wherein said first region of said chamber is located at a sufficient distance above said bottom region as to permit said molten material to cover and thermally insulate said lining.

33. An arrangement as defined in claim 26, wherein the interior of said chamber is of substantially cylindrical configuration.

34. An arrangement as defined in claim 26, wherein at least a bottom section of the interior of said chamber is of downwardly and outwardly flaring configuration.

35. An arrangement as defined in claim 1; and further comprising outlet means communicating with said second region of said chamber for withdrawing said molten material from said chamber.

36. An arrangement as defined in claim 1, wherein said melting means comprises flame-generating means.

37. An arrangement as defined in claim 36, wherein said flame-generating means is so arranged that the flame generated thereby extends across a major part of the cross-section of said column.

38. An arrangement as defined in claim 1, wherein said melting means comprises electric arc-generating means.

39. An arrangement as defined in claim 38, wherein said electric arc-generating means is so arranged that the electric arc generated thereby extends across a major part of the cross-section of said column.

40. A method as defined in claim 1; and further comprising the step of discontinuously withdrawing said molten material from said zone.

41. A method as defined in claim 40, wherein tapping is effected from time to time.

42. A method as defined in claim 1, wherein additional means are provided for superheating the molten material.

43. A method as defined in claim 42, the additional means for superheating comprising additional burners directed to the surface of the molten material.

* * * * *